United States Patent Office 3,293,324
Patented Dec. 20, 1966

3,293,324
2-DIMETHYLAMINO-2-METHYL-1-PROPANOL-p-TOLUENE SULFONATE WITH UREA-FORMALDEHYDE RESIN AND ALKYD RESIN
Frederick E. Tropp, Pittsburgh, and Ray T. Corkum, McDonald, Pa., assignors to American Cyanamid Company, Stamford, Conn., a corporation of Maine
No Drawing. Filed Nov. 8, 1962, Ser. No. 236,395
7 Claims. (Cl. 260—850)

This invention relates to a novel composition of matter comprising a termosetting aminoplast resin and a catalytic quantity of a salt of p-toluene sulfonic acid and 2-dimethylamino-2-methyl-1-propanol. Still further, this invention relates to novel compositions of matter comprising a blend of an alkyd resin and a thermosetting aminoplast resin catalyzed with a salt of p-toluene sulfonic acid and 2-dimethylamino-2-methyl-1-propanol. Still further this invention relates to the salt per se whether a neutral salt or an alkaline salt.

One of the objects of the present invention is to produce a catalyzed aminoplast resin composition which will have utility principally in the field of surface coatings. A further object of the present invention is to produce a salt of p-toluene sulfonic acid and 2-dimethylamino-2-methyl-1-propanol. A still further object of the present invention is to produce a composition of matter comprising a blend of a thermosetting aminoplast resin and a glyceride oil-modified alkyd resin catalyzed with a salt of p-toluene sulfonic acid and 2-dimethylamino-2-methyl-1-propanol. These and other objects of the present invention will be discussed in greater detail hereinbelow.

Thermosetting aminoplast resins are well known in the art and are produced by reacting an aldehyde, and more specifically formaldehyde, with a compound containing a plurality of amino groups to which are attached aldehyde reactable hydrogen atoms thereby providing sites for alkylol groups which are then available for condensation to provide a thermosetting resinous composition. Among the many compounds containing the afore-mentioned amino groups are the aminotriazines and more particularly melamine, benzoguanamine, acetoguanamine and the like. Additionally, one may make use of the ureas such as urea per se, thiourea, ethylene urea and the like. These resinous compositions may be either alkylated or unalkylated depending upon the principal end use. When the end use of these aminoplast resins is to be in the surface coating field, it is generally desirable to utilize the alkylated aminoplast resins. On the other hand, when the end use of the aminoplast resins of the present invention is to be in the molding or adhesive fields, it is generally preferred to utilize an unalkylated aminoplast resin. The aminotriazine resin compositions, particularly the alkylated triazine resins are disclosed in considerable detail in the U.S. Patent 2,197,357 wherein reaction conditions, mol ratios and the like are fully disclosed and said patent is incorporated herein by reference in order to avoid redundant repetition of facets of the art already well known. The urea resins both alkylated and nonalkylated are even older in the art than the aminotriazine resins and therefore it is deemed to be unnecessary to repeat details with respect to the preparation of said resins where said details are already well known in the art. These aminoplast resins may be used as the sole resinous composition or they may be blended with glyceride oil-modified alkyd resins particularly for coating resin purposes and said class of blended compositions is disclosed in considerable detail in the U.S. Patent 2,214,474 which is also incorporated herein by reference.

The salt of the present invention is prepared by neutralizing p-toluene sulfonic acid with 2-dimethylamino-2-methyl-1-propanol. The preparation of this salt is easily accomplished by adding a slight excess of the 2-dimethylamino-2-methyl-1-propanol to the p-toluene sulfonic acid dissolved in a substantially inert solvent. It is generally desired, in preparing this salt, to make use of a stainless steel or a glass-lined reactor vessel. An accepted procedure would be to charge about one mol of the p-toluene sulfonic acid to such a suitable reaction vessel whereupon a quantity of a solvent inert under the conditions of the process, such as isobutanol is added and the two components are stirred at room temperature until all of the acid is in solution. No cooling is required during this dissolution step. Thereupon about 1.25 mols of 2-dimethylamino-2-methyl-1-propanol are added slowly, with some cooling, to the acid solution. The temperature of the reaction mass is maintained as close to room temperature as possible in order to prevent the discoloration of the salt. The salt thus produced has a pH of 9–10.

In the preparation of this salt one can use exactly one mol of the acid per mol of the base and thereby produce a substantially neutral salt for a pH of about 7. If some slight basicity is desired, an excess of the base is used which raises the pH to any suitable level and insures that the catalytic material will remain substantially latent until the moment of use thereby avoiding any premature gelation of the product while in storage. If desired, one could extract the salt from the inert organic solvent in order to have a 100% solids salt product. However, in the use of the salt of the present invention, especially in aminoplast coating compositions, it is extremely advantageous to utilize the salt in a solution form and thereby introduce the catalyst solution to resinous composition with much greater ease.

In selecting a solvent for the p-toluene sulfonic acid, one must select a solvent that is inert to the acid and to the amine under the conditions of reaction. Water may be used as the inert solvent but may have certain shortcomings for this purpose, particularly if the ultimate salt is to be used in a water-insoluble aminoplast resin composition, as in this instance, the aqueous diluent thereof must be removed. To avoid the necessity of removing the solvent, one may utilize such inert solvents that are compatible with the water-insoluble aminoplast resins such as the organic solvents including the lower aliphatic alcohols such as methanol, ethanol, propanol, butanol and the like.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

*Preparation of the basic salt of p-toluene sulfonic acid and 2-dimethylamino-2-methyl-1-propanol*

Into a suitable reaction stainless steel vessel equipped with thermometer, stirrer and cooling means there is introduced 30 parts of p-toluene sulfonic acid to which is added 43.8 parts of isobutanol. The mixture is stirred at room temperature until all of the acid is in solution. No cooling is required up to this point. Thereupon 26.2 parts of 2-dimethylamino-2-methyl-1-propanol are added in small increments while cooling the system so as to avoid temperature elevation above room temperature. The procedure and addition is continued until all of the amine has been added.

The salt of the present invention when used with aminoplast resin will be used in the usual catalytic quantities, that is, from about 1% to about 5% by weight based on the total weight of the aminoplast resin solids. It is preferred to use between about 2% and 3% by weight of this salt, same basis. Even when the salt is used as a catalyst in an alkyd resin-aminoplast resin blend, the amount of catalyst would remain the same and would be calculated on the same basis since alkyd resins can be cured without need of a catalytic material.

The principal end use for the coating composition of the present invention would be in baking enamels or conversion wood finishes, particularly when low temperature cure is desired. Still further, the coating compositions of the present invention may be used with other film forming materials particularly short oil alkyd resins and cellulose acetate butyrate coating compositions. The latent catalyst of the present invention in an aminoplast resin composition provides a stable system, particularly in the liquid state. When used, the amine salt decomposes in the useful temperature range of 180° F. or higher. The liberated acid acts as a catalyst and results in a film of greater hardness and better chemical resistance than an uncatalyzed system while the presence of the amine gives a higher gloss in the baked film than when no amine is present and better than when other amines are present.

Aminoplast resins in general have been mentioned hereinabove in some detail but will be discussed in greater detail hereinbelow.

In the preparation of the melamine formaldehyde resins, it is generally desired to react between about 2 mols and 6 mols of formaldehyde per mol of melamine. For coating resin purposes, the formaldehyde to melamine ratio may be varied between about 3:1 and 4.5:1. The urea-formaldehyde resins are generally prepared by reacting from about 1.5 to 3.5 mols of formaldehyde per mol of urea and preferably from about 2 to 3 mols of formaldehyde per mol of urea. When alkylated aminoplast resins are desired, one may utilize any one of the lower aliphatic monohydric alcohols such as methanol, ethanol, propanol, isopropanol, normal butanol, isobutyl alcohol, tertiary butyl alcohol and the like. The degree of alkylation will be controlled in part by a measure of methylolation in the resinous material. It is not imperative that the resin be as fully alkylated as it is methylolated, although full alkylation is desirable for certain purposes.

When desired, alkyd resins may be added to the catalyzed aminoplast resins with or without a solvent diluent. These alkyd resins and the methods of preparing the same are well known in the art and have been disclosed in a plurality of published references such as patents and literature. An outstanding treatise on alkyd resins is to be found in "Organic Coating Technology" vol. 1, by Henry Flemming Payne and particularly chapter 7 thereof entitled "Alkyd Resins." These alkyd resins are prepared by reacting a polycarboxylic acid with a polyhydric alcohol generally in the presence of a glyceride oil. Ordinarily the polycarboxylic acid is one which is free of any nonbenzenoid unsaturation such as phthalic anhydride. The polyhydric alcohol is preferably glycerol although the glycols may be used, as well as the tetra and hexa hydric alcohols such as pentaerythritol and dipentaerythritol among others. When the dihydric alcohols are used they are preferably used with a polyhydric alcohol of higher functionality such as the pentaerythritols in order to give the polyhydric alcohol mixture an average functionality greater than 2.5. The glyceride oils are divided into three principal categories, namely, the non-drying, semi-drying and the drying glyceride oils. It is often conventional to make use of the fatty acids of glyceride oils and additionally monoglycerides of said fatty acids. These glyceride oil modified alkyd resins may be short oil, medium oil or long oil alkyd resins. The amount of aminoplast resin to be blended with the alkyd resin may be varied from about 15% to 40% by weight (solids basis) of the aminoplast resin and correspondingly from about 85% to about 60% by weight (solids) of the glyceride oil modified alkyd resin.

If the aminoplast resin is to be used for adhesive purposes no diluent is ordinarily used. When the catalyzed amioplast resin is to be used for molding purposes, it is generally blended with a suitable filler such as alpha cellulose and converted to a molding powder by the conventional steps of drying, comminuting and compacting. When the aminoplast resins of the present invention are used as coating compositions it is frequently desirable to utilize an inert organic solvent of which a plurality are conventionally known in the art. The amount of the solvent to be added will depend in great measure upon the coloring matter such as pigment or dye used with the coating composition, if any, and the mode by which the coating will be applied to a substrate. For spray coating purposes, the viscosity of the coating composition should be substantially lower than is generally required for roller coating and brushing.

The following examples are illustrative of specific embodiments of the aminoplast resins and the alkyd resins of the present invention.

*Melamine-formaldehyde resin*

| | Parts |
|---|---|
| Melamine (1 mol) | 126 |
| Formalin (5 mols) 37% formaldehyde in water (A commercially available product) | 405.5 |
| Isobutyl alcohol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the the water trap. During the distillation about 550 additional parts of isobutyl alcohol are added gradually. When the reflux condensate is substantially anhydrous, the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e.g., xylene.

*Urea-formaldehyde resin*

Into a suitable reaction vessel equipped with thermometer, stirrer, reflux condenser, decanter, heating and cooling attachments, inert gas inlet and outlet tubes, there is introduced 4952 parts of an 80% solution of isobutanol in water, 18,335 parts of isobutyl Formcel (comprising 40% formaldehyde, 53% isobtuyl alcohol and 7% water) and 13 parts of a 75% solution of phosphoric acid in water. With constant stirring, the charge is heated gradually to about 75–80° C. and held at about that temperature while adding 5,900 parts of urea at a substantially uniform rate over a period of about 75–90 minutes. If an exotherm develops during the urea addition, cooling of the vessel should be started so as to hold the temperature constant between about 75–80° C. When half of the urea has been added, an additional 1,906 parts of dry isobutanol are added. This addition helps control the exotherm. When the urea addition is completed, the system is closed and the decanting lines are connected. The reaction vessel is then heated gradually to the boil-up temperature. After about 7 hours of heating, samples are taken from the reaction vessel at least hourly for viscosity and solvent tolerance checks. When a viscosity of T-W on the Gardner-Holdt scale at 25° C. and a solvent tolerance of 130 minimum is reached, the decanting lines are disconnected and the system is switched to a distillation column at atmospheric pressure (reflux). The system is continued to be heated at boil-up until concentration is completed and is determined when a 50 gram sample "as is" plus 8 grams of xylene are blended to give a solution having a viscosity of V-X and a xylene dilution of at least 18/1. The charge is then cooled to about 80–90° C. whereupon 1810 parts of xylene are added and the total mixture is stirred for about one hour in order to achieve homogeneity.

*Alkyd resin A*

94 parts of glycerin, 148 parts of phthalic anhydride, and 120 parts of soya bean oil fatty acids are introduced into a suitable reaction chamber and are heated to about 210–230° C. until condensation is essentially complete. The resin has an acid number of 6–7 and a viscosity of $Z_1$ to $Z_3$ on the Gardner-Holdt scale at 25° C. when dissolved in an equal weight of xylene. The resin thus produced contains about 33 to 36% oil acids based on the total resin solids.

*Alkyd resin B*

148 parts by weight of phthalic anhydride, 98 parts of glycerin, and 98 parts of coconut oil fatty acids are introduced into a suitable reaction chamber and there heated gradually to about 210–230° C. and the mixture is held at this temperature until condensation is substantially complete and until an acid number of about 4–8 is reached. A solvent, such as xylene, is then added in a sufficient amount to adjust the solids content to about 60% whereupon the viscosity at 25° C. is about $Z_4$ to $Z_6$ on the Gardner-Holdt scale. The resin thus produced contains about 29–32% oil acids based on the total resin solids.

EXAMPLE 2

To 100 parts of the urea resin solution prepared hereinabove, containing 63% resin solids in xylene heated and controlled at about 40–50° C., there is added 1.58 parts of the salt of Example 1, with constant stirring to achieve dissolution of the salt solution in the resin solution. Films drawn down on sheet steel from the catalyzed urear-formaldehyde resin are baked at about 250° F. for about 45 minutes to produce a film which is scratch resistant, glossy, hard and resistant to solvents such as acetic acid, a 5% solution of sodium hydroxide and xylene. The film was somewhat brittle, however, and had relatively low impact strength.

EXAMPLE 3

A blend is prepared of 30 parts (solids) of the isobutylated melamine formaldehyde resin prepared hereinabove, with 70 parts (solids) of Alkyd Resin A. The resin blend is cut with a 1:1 mixture of butanol and xylene to a 50% solids solution. 2.5%, by weight, based on the solids weight of the melamine resin, of the salt prepared according to Example 1, is added. The coating is pigmented with titanium dioxide and after thorough blending, a film is drawn down on a steel sheet and baked at 250° F. for 30 minutes. The resultant film is scratch resistant, glossy and hard, and displays excellent adhesion to the metal. Still further, the film is far more flexible than the film of Example 2 as displayed by its enhanced impact resistance. Still further, the film thus produced is resistant to acetic acid, sodium hydroxide and xylene.

EXAMPLE 4

A blend is made of 25 parts of the urea-formaldehyde resin prepared hereinabove and 75 parts of an Alkyd Resin B (solids basis for each). The resin blend is cut with xylene to 60% solids and is catalyzed with 2% of the salt of Example 1. In order to produce a clear film, no pigment was used. A film is drawn down on a glass plate and is baked at 210° F. for 60 minutes. The resulting coating is clear, water white, scratch resistant, glossy and hard, and displays good adhesion to glass.

It has been shown in Example 1 that the salt of the present invention can be prepared separately and then added to the resinous material. However, the appropriate amount of the 2-dimethylamino-2-methyl-1-propanol may be added to the resin solution, then, one may add the p-toluene sulfonic acid in the form of an alcohol solution at temperatures between room temperature and about 50° C. thus forming the salt in situ in the resin solution.

We claim:
1. 2-dimehtylamino-2-methyl-1-propanol p-toluenesulfonate.
2. A composition of matter comprising a thermosetting urea-formaldehyde resin and as a catalyst therefor from about 1% to about 5%, by weight, based on the total weight of the urea resin solids of 2-dimethylamino-2-methyl-1-propanol p-toluenesulfonate.
3. A composition of matter comprising a thermosetting alkylated urea-formaldehyde resin and as a catalyst therefor from about 1% to about 5%, by weight, based on the total weight of the urea resin solids of 2-dimethylamino-2-methyl-1-propanol p-toluenesulfonate.
4. A composition of matter comprising a thermosetting butylated urea-formaldehyde resin and as a catalyst therefor from about 1% to about 5%, by weight, based on the total weight of the urea resin solids of 2-dimethylamino-2-methyl-1-propanol p-toluenesulfonate.
5. A composition of matter comprising a thermosetting isobutylated urea-formaldehyde resin and as a catalyst therefor from about 1% to about 5%, by weight, based on the total weight of the urea resin solids of 2-dimethylamino-2-methyl-1-propanol p-toulenesulfonate.
6. A composition of matter comprising a blend of an alkyd resin and an alkylated urea-formeldehyde resin and as a catalyst therefor from about 1% to about 5%, by weight, based on the total weight of the urea resin solids of 2-dimethylamino-2-methyl-1-propanol p-toluenesulfonate.
7. A composition of matter comprising a blend of an alkyd resin and a butylated urea-formaldehyde resin and as a catalyst therefor from about 1% to about 5%, by weight, based on the total weight of the urea resin solids of 2-dimethylamino-2-methyl-1-propanol p-toluenesulfonate.

References Cited by the Examiner

UNITED STATES PATENTS

| | | | |
|---|---|---|---|
| 2,687,397 | 8/1954 | Dannenberg | 260—834 |
| 2,853,459 | 9/1958 | Christenson | 260—850 |
| 3,154,427 | 10/1964 | Forrest et al. | 260—850 |

MURRAY TILLMAN, *Primary Examiner.*

P. LIEBERMAN, *Assistant Examiner.*

UNITED STATES PATENT OFFICE
CERTIFICATE OF CORRECTION

Patent No. 3,293,324                  December 20, 1966

Frederick E. Tropp et al.

It is hereby certified that error appears in the above numbered patent requiring correction and that the said Letters Patent should read as corrected below.

Column 5, line 44, for "urear" read -- urea --; line 46, for "250" read -- 230 --; column 6, line 24, for "2-dimehtylamino-2-methyl-1-propanol p-toluenesulfonate" read -- 2-dimethylamino-2-methyl-1-propanol p-toluenesulfonate --.

Signed and sealed this 5th day of September 1967.

(SEAL)
Attest:

ERNEST W. SWIDER
Attesting Officer

EDWARD J. BRENNER
Commissioner of Patents

Notice of Adverse Decision in Interference

In Interference No. 95,969 involving Patent No. 3,293,324, F. E. Tropp and R. T. Corkum, 2-DIMETHYLAMINO-2-METHYL-1-PROPANOL-p-TOLUENE SULFONATE WITH UREA-FORMALDEHYDE RESIN AND ALKYD RESIN, final judgment adverse to the patentees were rendered Sept. 17, 1968, as to claim 1.

[*Official Gazette October 29, 1968.*]